US011175975B1

(12) United States Patent
Wilson (10) Patent No.: US 11,175,975 B1
(45) Date of Patent: Nov. 16, 2021

(54) SYSTEMS AND METHODS FOR DETECTING FAULTS IN A TELECOMMUNICATION SYSTEM USING RETRAIN DATA

(71) Applicant: ADTRAN, INC., Huntsville, AL (US)

(72) Inventor: Arlynn Wayne Wilson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 26 days.

(21) Appl. No.: 16/232,904

(22) Filed: Dec. 26, 2018

(51) Int. Cl.
*G06F 11/07* (2006.01)
*H04L 12/24* (2006.01)
*H04M 3/30* (2006.01)

(52) U.S. Cl.
CPC ........ *G06F 11/079* (2013.01); *G06F 11/0709* (2013.01); *G06F 11/0751* (2013.01); *H04L 41/0677* (2013.01); *H04M 3/306* (2013.01)

(58) Field of Classification Search
CPC ............... G06F 11/079; G06F 11/0709; G06F 11/0751; H04L 41/0677
See application file for complete search history.

(56) References Cited

U.S. PATENT DOCUMENTS

| | | | | |
|---|---|---|---|---|
| 8,116,218 | B2 * | 2/2012 | Lv | H04M 11/062 |
| | | | | 370/252 |
| 9,380,152 | B2 | 6/2016 | Joffe et al. | |
| 2002/0110221 | A1 | 8/2002 | Norrell et al. | |
| 2011/0191472 | A1 * | 8/2011 | Croot | H04M 3/304 |
| | | | | 709/224 |
| 2012/0224674 | A1 * | 9/2012 | Goodson | H04M 3/34 |
| | | | | 379/27.01 |
| 2015/0003596 | A1 * | 1/2015 | Croot | H04M 3/367 |
| | | | | 379/93.08 |
| 2015/0085996 | A1 * | 3/2015 | Mohseni | H04M 3/306 |
| | | | | 379/22.04 |
| 2015/0163349 | A1 | 6/2015 | Ardestani et al. | |
| 2016/0087864 | A1 * | 3/2016 | Kerpez | H04L 1/20 |
| | | | | 370/242 |
| 2017/0026257 | A1 * | 1/2017 | Horsley | H04L 43/16 |
| 2017/0180549 | A1 | 6/2017 | Zahedi et al. | |
| 2018/0027113 | A1 | 1/2018 | Mohseni et al. | |

OTHER PUBLICATIONS

Wilson, et al., U.S. Appl. No. 16/123,906, entitled, "Systems and Methods for Locating Faults in a Telecommunication Line Using Line Test Data," filed Sep. 6, 2018.

* cited by examiner

*Primary Examiner* — Matthew M Kim
*Assistant Examiner* — Kurosu Risa Altaf
(74) *Attorney, Agent, or Firm* — Maynard Cooper & Gale, P. C.; Jon E. Holland (57) ABSTRACT

Systems and methods are provided for detecting fault conditions associated with an distribution point in a communication system using retrain event data. The retrain event data is collected for all of the ports associated with a target site of the distribution point. The collected retrain event data can then be organized into several different categories such as upstream related retrain events and downstream related retrain events. A screening criteria can be selected that is associated with a fault condition. The screening criteria can be evaluated using one or more evaluation metrics. Each evaluation metric can be based on normalized parameters generated from the categorized retrain event data. If all of the evaluation metrics associated with a screening criteria are satisfied, then the screening criteria is satisfied and the target site is determined to have a fault condition.

27 Claims, 8 Drawing Sheets

SYSTEMS AND METHODS FOR DETECTING FAULTS IN A TELECOMMUNICATION SYSTEM USING RETRAIN DATA

BACKGROUND

A network service provider can provide telephone service and/or high speed data service to its customers using a telecommunication system such as a DSL (digital subscriber line) system. The system can use existing metallic (e.g., copper) wires (sometimes referred to as drop connections) that extend from a distribution point in the system to the customer premises to provide the telephone service and/or high speed data service to the customer. If there are anomalies or defects (e.g., a bad connection) associated with the components of the distribution point, a fault condition may occur and the customer may experience problems (e.g., intermittent echoes or loss of connection) with his or her service.

Due to the intermittent nature of some of the anomalies or defects, the identification of the source of the anomaly or defect can be difficult for maintenance personnel. One technique to remediate fault conditions can be for a maintenance person to attempt to identify the source of an anomaly or defect by travelling to the distribution point and using test equipment to identify the source of the anomaly or defect. However, sending a maintenance person to the distribution point in order to identify the source of an anomaly or defect can be expensive and time consuming. Another technique to remediate fault conditions can be to replace the hardware components associated with the ports for drop connections that undergo frequent retrain sequences. However, replacing hardware components based on the frequency of retrain sequences may result in the unnecessary replacement of at least some hardware components.

BRIEF DESCRIPTION OF THE DRAWINGS

Wherever possible, the same reference numbers are used throughout the drawings to refer to the same or like parts.

DETAILED DESCRIPTION

The present application is directed to systems and methods for detecting fault conditions (e.g., bad connections) associated with a distribution point in a communication system using retrain event data that is collected for the ports associated with the distribution point or a portion thereof. In one embodiment, the retrain event data can be collected for the ports that are associated with a target site (e.g., a particular hardware component or group of hardware components used at the distribution point). The identification of the target site to be evaluated for fault conditions can be performed using different techniques. For example, if a port or group of ports are undergoing frequent retrain sequences, the hardware components associated with the port(s) being retrained may be identified as the target site. In another example, customer complaints may be used to identify a target site.

Once the target site has been identified, retrain event data for each of the ports associated with the target site is collected. The collected retrain event data can then be filtered to remove certain retrain events from the data set that are not of interest in determining fault conditions. The remaining retrain event data from all of the ports can then be organized into several different categories. For example, upstream related retrain events can be collected in one category, while downstream related retrain events can be collected into a second category. In addition, specific types of retrain events (which may also include a directional component such as upstream or downstream) can also be collected into categories.

The target site can then be evaluated with respect to a screening criteria that is associated with a type of fault condition. The screening criteria can include one or more evaluation metrics that can be used to evaluate the screening criteria. The evaluation metrics for the screening criteria can be used to identify a "pattern" of specific types of retrain events occurring at the ports for the target site. The identification of the "pattern" in the retrain event data collected from the ports at the target site can be indicative of the fault condition associated with the screening criteria. Each evaluation metric can be calculated as a normalized parameter or value based on the retrain event data from the ports in the target site. For example, a normalized parameter may correspond to a ratio of the number of retrain events in selected categories of the retrain event data. An exemplary normalized parameter for an evaluation metric can be based on the ratio of the number of upstream related retrain events to the number of downstream related retrain events. The normalized parameter for the evaluation metric can then be compared to a corresponding threshold value. If the threshold value condition is satisfied (e.g., the normalized parameter is greater than the threshold value), the evaluation metric for the screening criteria is determined to be satisfied. Each evaluation metric associated with a screening criteria can undergo a similar evaluation. If all of the evaluation metrics associated with a screening criteria are satisfied, then the screening criteria is determined to be satisfied and the target site is determined to have the fault condition associated with the screening criteria. However, if all of the evaluation metrics are not satisfied, then the screening criteria is determined to not have been satisfied.

After a fault condition is determined to be present at the target site, an appropriate remedial action can be taken to address the fault condition. For example, one or more of the hardware components associated with the target site and corresponding to the identified fault condition may be replaced. Alternatively, a software update may be performed on one or more of the hardware components to respond to the fault condition. If a particular screening criteria is not satisfied at a target site, the target site may be evaluated with respect to other screening criteria (as described above) that are associated with other types of fault conditions.

Figure 1:
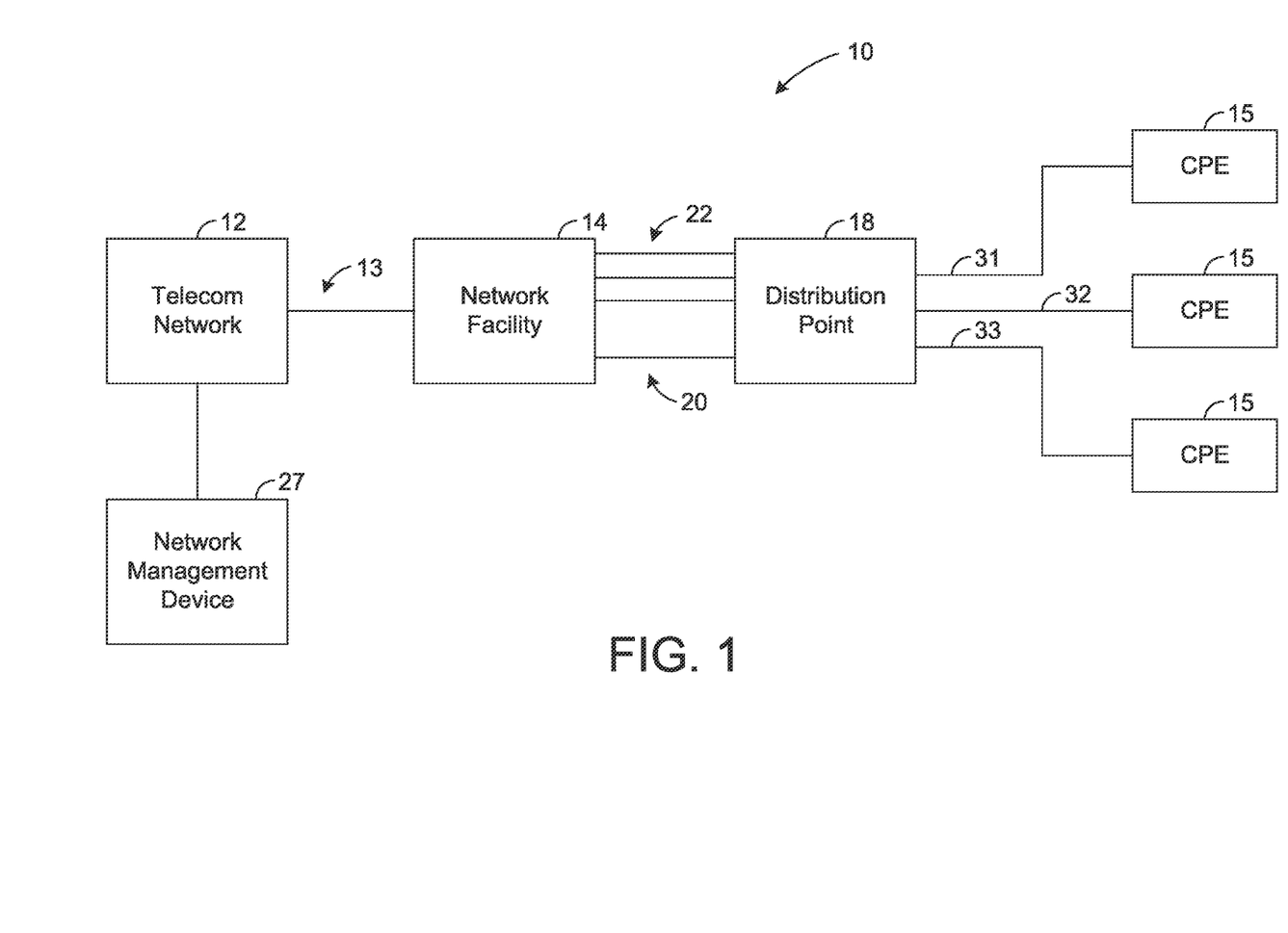
FIG. 1 is a block diagram showing an embodiment of a telecommunication system.

FIG. 1 depicts an embodiment of a telecommunication system 10. As shown by FIG. 1, the system 10 includes a telecommunication network 12 configured to communicate with customer premises equipment (CPE) 15 at corresponding customer premises. The network 12 can include any of various types of telecommunication networks, such as the public switched telephone network (PSTN), local area networks (LANs), wide area networks (WANs), cellular networks, the Internet, or other types of networks known to carry telecommunication signals. The network 12 may be coupled to a network facility 14, such as a central office, by one or more network lines 13. In some embodiments, the network line 13 can include an optical fiber, but other types of network lines, such as one or more twisted-wire pairs, may be used in other embodiments.

The network facility 14 can be connected to a distribution point 18 by at least one high-speed data connection 20 (e.g., an optical fiber) and by POTS (plain old telephone service) lines 22. The high-speed data connection 20 provides a high-speed channel that carries a data stream between the distribution point 18 and the network facility 14 and the POTS lines 22 carry POTS signals between the distribution point 18 and the network facility 14. While the embodiment in FIG. 1 shows one distribution point 18 connected to the network facility 14 and three CPEs 15 connected to the distribution point 18, more than one distribution point 18 can be connected to the network facility 14 and more or less than three CPEs 15 can be connected to an distribution point 18. In addition, there may be more than one distribution point 18 connected between the network facility 14 and a CPE 15. In other embodiments, the distribution point 18 can be incorporated within the network facility 14 or can correspond to any point (sometimes referred to as an intermediate point) located between the network facility 14 and the CPEs 15 having a suitable hardware configuration to facilitate communication between the CPEs 15 and the network facility 14.

As shown by FIG. 1, the distribution point 18 is connected or coupled to CPEs 15 via a plurality of connections 31-33. The connections 31-33 can be conductive connections, such as twisted-wire pairs, or optical connections, such as fiber-optic cables. The connections 31-33 from the distribution point 18 to the CPEs 15 can typically be referred to as "drop connections" or "subscriber lines." Each subscriber line 31-33 can be connected to a corresponding CPE 15, such as a telephone, a high-speed data unit (HSDU), or a fax machine. In some embodiments, each subscriber line 31-33 includes at least one twisted-wire pair, and digital subscriber line (DSL) modulation formats are used to communicate data across the subscriber lines 31-33.

In an embodiment, DSL protocols such as asymmetric DSL (ADSL), very-high-bit-rate DSL (VDSL), G.fast, high-bit-rate DSL (HDSL), VDSL2 or other known protocols can be used to communicate data across the subscriber lines 31-33. If desired, vectoring operations can be performed across the subscriber lines 31-33 to reduce crosstalk between the subscriber lines 31-33. The vectoring operations can include adjusting one or more vectoring coefficients associated with each of the subscriber lines 31-33 such that crosstalk from interfering subscriber lines 31-33 can be cancelled. The mathematical coupling of the subscriber lines 31-33 by the vectoring operations can propagate the effect of a fault in one subscriber line 31-33 to some or all of the other subscriber lines 31-33, making it difficult to identify the source of a defect using conventional methods.

Figure 2:
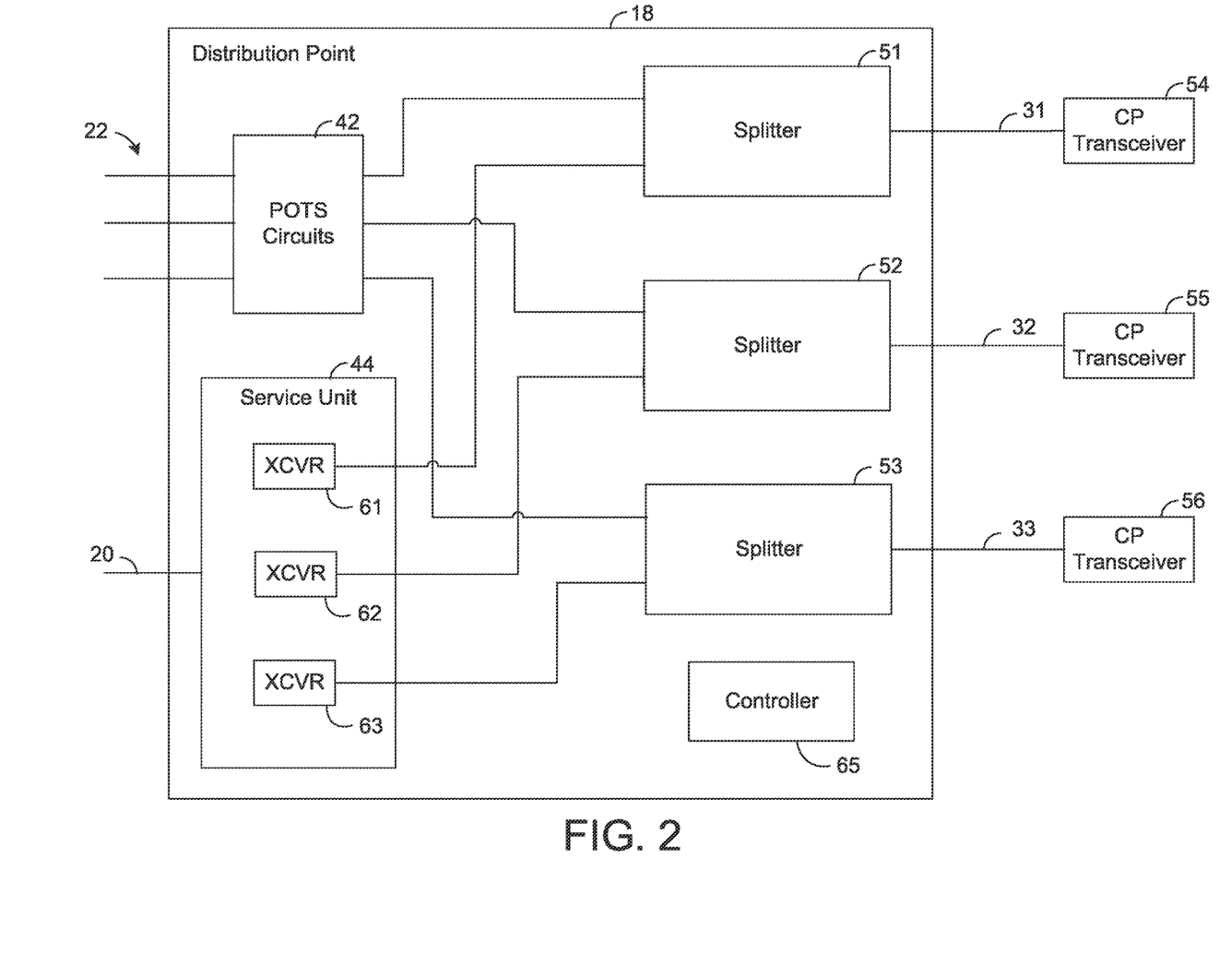
FIG. 2 is a block diagram showing an embodiment of an distribution point from the telecommunication system of FIG. 1.

FIG. 2 depicts an embodiment of a distribution point 18 that has equipment for providing voice and/or high-speed data to CPEs 15. As shown by FIG. 2, the distribution point 18 can include one or more POTS circuits 42 that are coupled to POTS lines 22, one or more service units 44 (each with one or more corresponding transceivers 61-63) that are coupled to high-speed data connection 20 and a plurality of splitters 51-53 that are respectively coupled to the subscriber lines 31-33. In an embodiment, the service unit 44 can be a DSL Access Multiplexer (DSLAM) and the splitters 51-53 can be mounted on one or more splitter modules that are connected to a corresponding chassis for holding the splitter module(s) and other components. In the embodiment shown by FIG. 2, the splitter 51 is coupled to a CP transceiver 54 associated with a corresponding CPE 15 by the subscriber line 31, the splitter 52 is coupled to a CP transceiver 55 associated with a corresponding CPE 15 by the subscriber line 32, and the splitter 53 is coupled to a CP transceiver 56 associated with a corresponding CPE 15 by the subscriber line 33.

In one embodiment, the service unit 44 can include communication circuitry (not shown) that is coupled to the high-speed data connection 20 and a switching element (not shown) that is coupled between the communication circuitry and the transceivers 61-63. The communication circuitry can process the signal received from the high-speed data connection 20 and may include a classifier (not shown) for classifying traffic received from the high-speed data connection 20, as is known in the art. In an embodiment, the communication circuitry can include an optical network unit (ONU) (not shown) that can receive at least one packet flow from the high-speed data connection 20 and convert the received packet flow(s) from the optical domain to the electrical domain. At least a portion of the converted packet flow(s) can then be forwarded to a switching element (or switch matrix) and then sent by the transceivers 61-63 to the CPEs 15 (and CP transceivers 54-56) through the splitters 51-53, as will be described in more detail below.

The switching element (or switch matrix) of the service unit 44 can be configured to forward the data packets of the high-speed data stream from the communication circuitry to the transceivers 61-63 based on the destination addresses in the data packets such that each data packet is ultimately received by the CPE 15 (and corresponding CP transceivers 54-56) identified by the packet's destination address. The switching element may be implemented in hardware or a combination of hardware and software. In one embodiment, the switching element can be a field programmable gate array (FPGA), but other type of control or switching devices can be used for the switching element in other embodiments.

In the downstream direction, the communication circuitry of the service unit 44 receives data packets from the high-speed data connection 20 and provides such data packets to the switching element, which is configured to forward the data packets to the transceivers 61-63 based on header information within the data packets using forwarding techniques known in the art. When a transceiver 61-63 receives data packets from the switching element of the service unit 44, the transceiver 61-63 modulates a carrier signal with the data packets to form a data signal that is transmitted by transceiver 61-63 to a respective splitter 51-53 for transmission across the splitters respective subscriber line 31-33. Similarly, the POTS circuits 42 can receive POTS signals from POTS lines 22 and provide the POTS signals to the corresponding splitters 51-53 for transmission across the subscriber lines 31-33.

In the upstream direction, the splitters 51-53 receive modulated data signals from the subscriber lines 31-33 and provide the modulated data signals to the splitters respective transceiver 61-63. For a given signal received by a transceiver 61-63, the transceiver 61-63 demodulates the received signal to recover data packets. The service unit 44 combines the data packets received by the transceivers 61-63 into a high-speed data stream, which is transmitted across the high-speed data connection 20. Similarly, the splitters 51-53 can receive upstream POTS signals from the subscriber lines 31-33 and provide the POTS signal to the POTS circuits 42 for transmission across POTS lines 22.

Each transceiver 61-63 can be coupled to at least one controller 65 that is configured to perform various functions, as will be described in more detail below. The controller 65 may be implemented as a combination of hardware and software, such as at least one microprocessor or other type of processor programmed with instructions for performing various functions. Other configurations of the controller 65 are possible in other embodiments. As an example, the controller 65 may be implemented as a field programmable gate array (FPGA) or other type hardware as may be desired.

Figure 3:
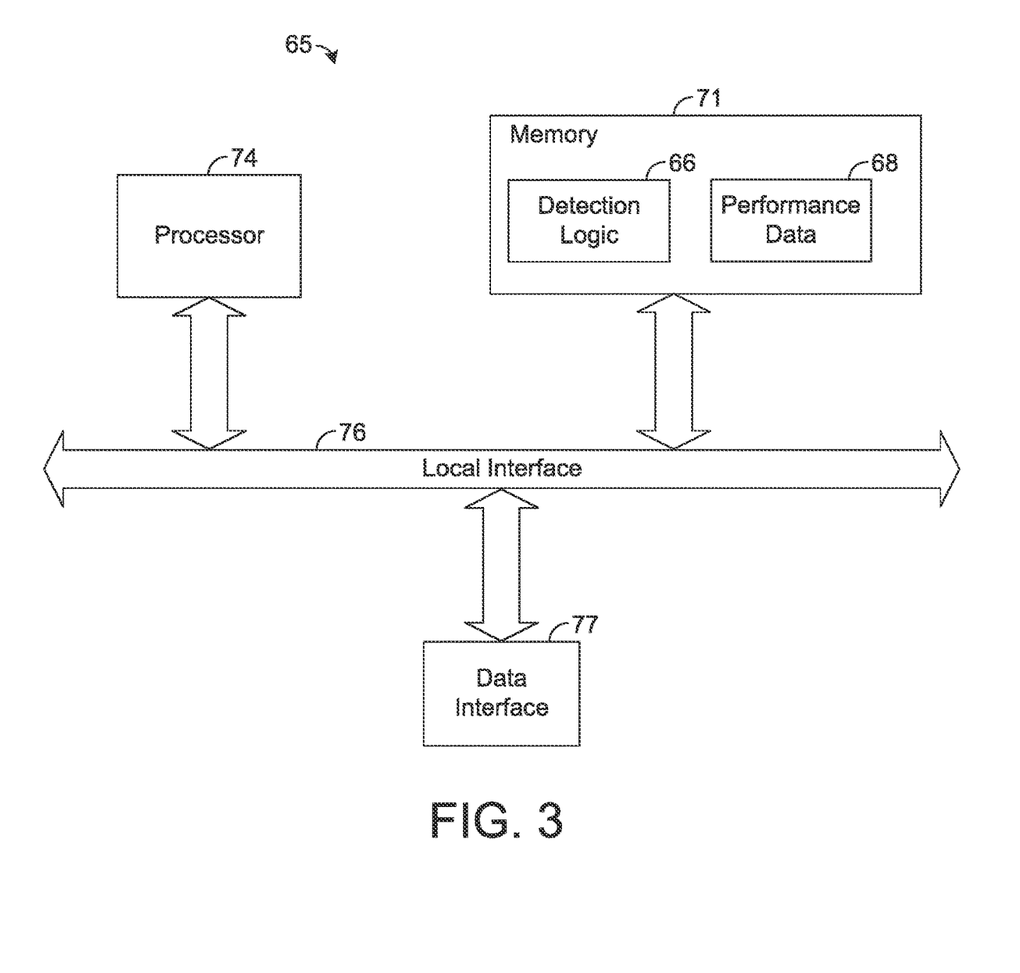
FIG. 3 is a block diagram showing an embodiment of a controller from the distribution point of FIG. 2.

FIG. 3 depicts an embodiment of the controller 65. As shown by FIG. 3, the controller 65 may include detection logic 66 to identify fault conditions associated with the distribution point 18 in response to retrain events at the splitters 51-53. The information or data associated with the retrain events can be stored in performance data 68. The controller 65 may also include a vector engine (not shown) for performing crosstalk vectoring in order to cancel far-end crosstalk (FEXT) that couples from one subscriber line 31-33 to another. Exemplary techniques for performing crosstalk vectoring are described in commonly-assigned U.S. Pat. No. 8,582,425, entitled "Systems and Methods for Cancelling Crosstalk in Satellite Access Devices" and granted on Nov. 12, 2013, which is incorporated herein by reference.

The detection logic 66 can be implemented in software, hardware, firmware or any combination thereof. In the controller 65 illustrated by FIG. 3, the detection logic 66 is implemented in software and stored in memory 71 of the controller 65. Note that the detection logic 66, when implemented in software, can be stored and transported on any non-transitory computer-readable medium for use by or in connection with an instruction execution apparatus that can fetch and execute instructions. In the context of this document, a "computer-readable medium" can be any means that can contain or store a program for use by or in connection with an instruction execution apparatus.

The controller 65 shown by FIG. 3 includes at least one conventional processor 74, which has processing hardware for executing instructions stored in memory 71. As an example, the processor 74 may include a central processing unit (CPU), a digital signal processor (DSP), a microprocessor or a network processor that communicates to and drives the other elements within the controller 65 via a local interface 76, which can include at least one bus. Furthermore, a data interface 77 permits the controller 65 to receive data from or communicate data to other components of the distribution point 18 (e.g., splitters 51-53) as may be desired.

In the embodiment shown by FIG. 2, the controller 65 is shown as part of the distribution point 18 and may be at the same location as other components of the distribution point 18, such as the splitters 51-53, for example. However, at least portions of the controller 65 may be incorporated into other components of the distribution point (e.g., service unit 44) and/or dispersed geographically and/or reside at other locations relative to other components of the distribution point 18. As an example, the controller 65 may be located in the network facility 14 external to the distribution point 18 and communicate with components of the distribution point 18 using the high-speed data connection 20 or another channel, such as a cellular network. For example, retrain events at the transceivers 61-63 may be reported to the detection logic 66 of the controller 65 at the network facility 14 through the high-speed data connection 20, and the detection logic 66 may then analyze the retrain events to determine fault conditions remotely using techniques similar to those described herein.

In another embodiment, at least portions of the controller 65 may be incorporated into a network management device 27 (see FIG. 1). The network management device 27 can be coupled to the network 12 and communicate with the network facility 14 and distribution point 18 via network 12 to retrieve the performance data 68 (including retrain events) from the distribution point 18 and analyze the data to determine if a fault condition is associated with the distribution point 18. If the network management device 27 determines that a fault condition is associated with the distribution point 18, the network management device 27 can notify the corresponding distribution point 18 and/or corresponding service personnel so that remedial actions can be taken. In another embodiment, the network management device 27 can be located at the network facility 14.

Figure 4:
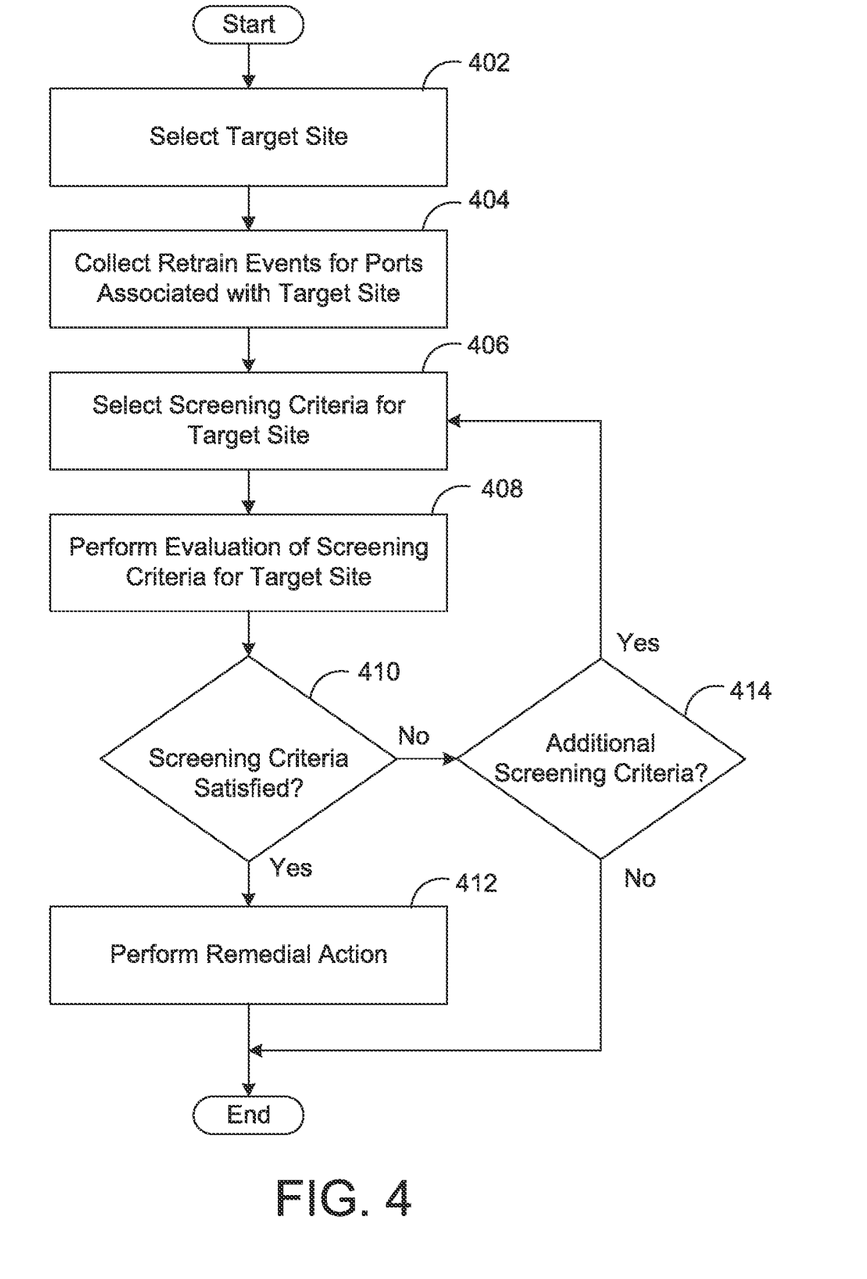
FIG. 4 is a flowchart showing an embodiment of a process for evaluating a site for a fault condition.

FIG. 4 shows an embodiment of a process for evaluating a site for fault conditions caused by defective connections and/or defective components. The process begins by selecting a target site (e.g., a distribution point 18 or a portion of distribution point 18) to be evaluated for fault conditions (step 402). For example, the target site may correspond to specific hardware components such as a group of splitters 51-53 connected to a corresponding backplane. The selection of the target site can be based on customer complaints associated with the performance of CPEs 15 connected to the target site and/or one or more ports (or IP addresses) at the target site being associated with retrain sequences. Exemplary techniques for performing retrains are described in commonly-assigned U.S. patent application Ser. No. 15/951,306, entitled "Automatic Configuration Updating to Stabilize Ports in a Telecommunication System" and filed on Apr. 12, 2018, which is incorporated herein by reference. In an embodiment, the performance data 68 can store performance metrics, such as retrain events, for each transceiver 61-63 (and its corresponding port) associated with the target site. In one embodiment, a port of the target site can include a transceiver 61-63 and associated circuitry (e.g., analog front end circuitry and/or a digital signal processor) to facilitate the sending and receiving of signals with CP transceivers 54-56. Each time a transceiver 61-63 is retrained (or reinitialized) as a result of an error, signal margin fluctuation, or other similar triggering event, the performance data 68 associated with that transceiver 61-63 (and corresponding port) stored at the controller 65 can be updated. The transceiver 61-63 or service unit 44 can send a message to the controller 65 that indicates that the transceiver 61-63 has been retrained. The message provided to the controller 65 can include the time and the reason the transceiver 61-63 was retrained (if such information is provided by the transceiver 61-63). In addition, the message from the transceiver 61-63 can also indicate that the retrain of the transceiver 61-63 was initiated by at least one of the distribution point 18, CPE 15 or the network facility 14.

Once the target site has been selected, the controller 65 can collect all of the retrain events, regardless of the location of the device (e.g., network facility 14, distribution point 18 or CPEs 15) that initiated a retrain event, for the transceivers 61-63 of the ports associated with the selected target site (step 404). In one embodiment, the collecting of the retrain events by the controller 65 can exclude certain preselected retrain events. For example, the controller 65 can exclude retrain events associated with reset or stop activities at the network facility and/or retrain events associated with a CPE 15 being turned off. The controller 65 can then select an appropriate screening criteria to evaluate for a specific fault condition (e.g., a defective connection) at the selected target site (step 406). The selected screening criteria can include one or more evaluation metrics that are based on a pattern of preselected groupings of retrain events or ratios of preselected groupings of retrain events that occur at the ports of the target site. Each specific fault condition can have a corresponding set of screening criteria and pattern of retrain event groupings that is associated with the fault condition. In other embodiments, certain screening criteria may be associated with multiple fault conditions and/or multiple fault conditions can be associated with one set of screening criteria.

An evaluation of the selected screening criteria can then be performed (step 408). The evaluation of the selected screening criteria can include a comparison of the evaluation metrics of the screening criteria to preselected threshold values. In addition, if multiple screening criteria have been selected as being associated with the fault condition, the evaluation of the screening criteria can also include determining if all of the screening criteria have been satisfied. In an embodiment, the evaluation of the screening criteria for the target site can be performed as described below with respect to FIG. 5. However, in other embodiments, other processes for evaluating screening criteria can be performed. After the screening criteria has been evaluated, a determination is then made as to whether the screening criteria has been satisfied (step 410). In one embodiment, the satisfaction of the screening criteria is an indication that the fault condition is present at the target site.

If the screening criteria has been satisfied, one or more remedial actions can be performed (step 412) to respond to the fault condition. In one embodiment, the controller 65 can send a message or an alarm to a network administrator or other user informing the person that appropriate remedial action should be performed to remediate the fault condition at the target site. The appropriate remedial action can include the replacement of specific hardware components and/or the reconnection of improper and/or defective connections (e.g., a loose connection). In another embodiment, the controller 65 can automatically provide software updates to components at the target site to reconfigure the components at the target site to remediate the fault condition.

If the screening criteria has not been satisfied, a determination can then be made if additional screening criteria need to be evaluated (step 414). Additional screening criteria may need to be evaluated if there is more than one possible fault condition at a target site. If there are additional screening criteria to be evaluated, the process returns to step 406 to select additional screening criteria corresponding to another fault condition. If there is no additional screening criteria to be evaluated, the process ends.

Figure 5:
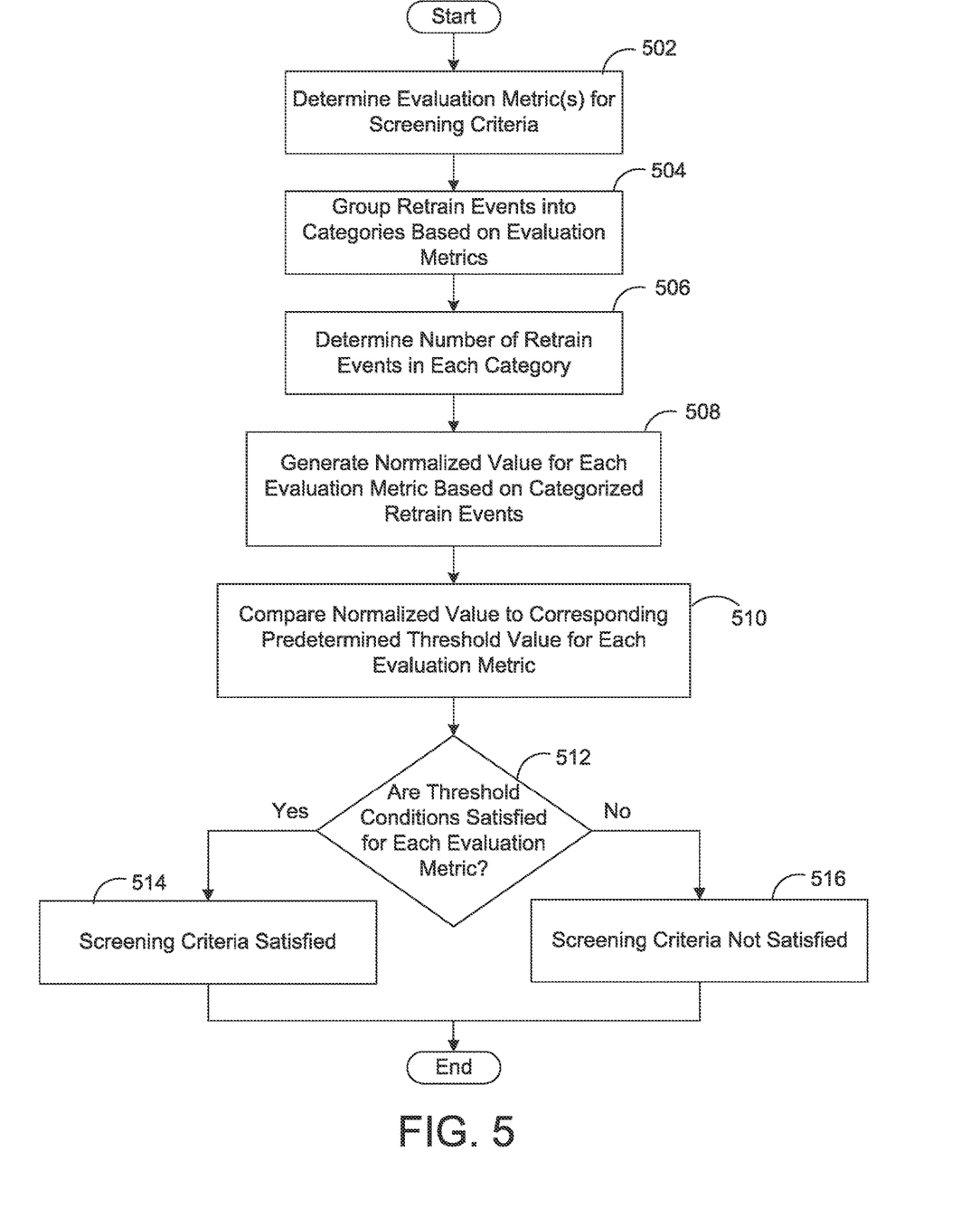
FIG. 5 is a flowchart showing an embodiment of a process for evaluating screening criteria associated with a fault condition.

FIG. 5 shows an embodiment of a process for evaluating screening criteria associated with a fault condition at a target site. In one embodiment, the process of FIG. 5 can be used to perform the evaluation of the screening criteria from step 408 in FIG. 4. However, the process of FIG. 5 can be used to evaluate screening criteria in other applications. The process begins by determining the evaluation metric(s) associated with the screening criteria (step 502). In one embodiment, the evaluation metrics for a screening criteria can be based on specific categories and/or specific types of retrain events. For example, an evaluation metric can be associated with a category of directional retrain events (e.g., upstream or downstream related retrain events), a specific type of retrain event (e.g., a CPE lost retrain event), or a category of retrain events of a specific type and a specific direction (e.g., upstream loss of margin retrain events). Exemplary retrain events that can be collected and associated with evaluation metrics are identified below in Tables 1 and 2, which are directionally organized into upstream retrain events and downstream retrain events respectively and can include retrain events initiated by the network facility 14, the distribution point 18 or the CPEs 15.

TABLE 1

| Upstream Retrain Events |
| --- |
| Increased Noise Upstream |
| Upstream Bitswap Error #1 |
| Upstream Bitswap Error #2 |
| Upstream Bitswap Error #3 |
| Upstream Channel Error |
| Upstream Loss of Margin Error #1 |
| Upstream Loss of Margin Error #2 |

TABLE 2

| Downstream Retrain Events |
| --- |
| Increase Noise Downstream |
| Downstream Bitswap Error #1 |
| Downstream Bitswap Error #2 |
| Downstream Bitswap Error #3 |
| Downstream Channel Error |
| Downstream Loss of Margin Error #1 |
| Downstream Loss of Margin Error #2 |
| Downstream Rate Adaption Error |

It should be noted that the retrain events or reasons described herein are exemplary, and other retrain events are possible. In this regard, when a retrain occurs, the transceiver 61-63 involved in the retrain is typically designed to evaluate or diagnose a problem or condition that caused the retrain and provide a notification to the controller 65 indicating the time of the retrain, as well as the reason for the retrain. Such statement may be vendor-specific (e.g., a code used by the vendor of the transceiver 61-63 to identify the retrain event). Exemplary retrain events are shown in Tables 1 and 2, but other types of statements may be used to indicate the same or other retrain events in other examples. The controller 65 may be configured to receive such notifications from the transceivers 61-63 and include the information from such notifications in the performance data 68.

The collected retrain events are then categorized according to the corresponding evaluation metrics (step 504). The controller 65 can parse the collected retrain events in performance data 68 and organize the retrain events from all the ports into corresponding categories based on the determined evaluation metrics. In one embodiment, depending on the determined evaluation metric, a single retrain event may be placed into more than one evaluation metric category. For example, if evaluation metrics are associated with upstream retrain events and upstream loss of margin retrain events, a specific upstream loss of margin retrain event from a port can be grouped into the categories associated with both evaluation metrics. After the retrain events are organized into the categories associated with the evaluation metrics, the number of retrain events in each category is then determined by the controller 65 (step 506).

The controller 65 can then generate a normalized value or parameter for each of the evaluation metrics (step 508). In one embodiment, the normalized value for the evaluation metric can be based on a ratio of two (or more) retrain event categories that are associated with the evaluation metric. Once the normalized values for the evaluation metrics have been generated, the normalized value can then be compared to a predetermined threshold value associated with each evaluation metric (step 510). The predetermined threshold value can be a value that can be indicative of the presence of the fault condition at the target site when the predetermined threshold value condition is satisfied. The predetermined threshold value condition can be evaluated by determining whether the normalized value is one of greater than, greater than or equal to, less than, less than or equal to, or equal to the predetermined threshold value depending on the normalized value and threshold value being evaluated. A determination can then be made as to whether the normalized value satisfies the predetermined threshold value condition for each evaluation metric (step 512). Some exemplary evaluation metrics for an exemplary screening criteria and corresponding logic for performing steps 508-512 for the evaluation metric are provided below.

Figure 6:
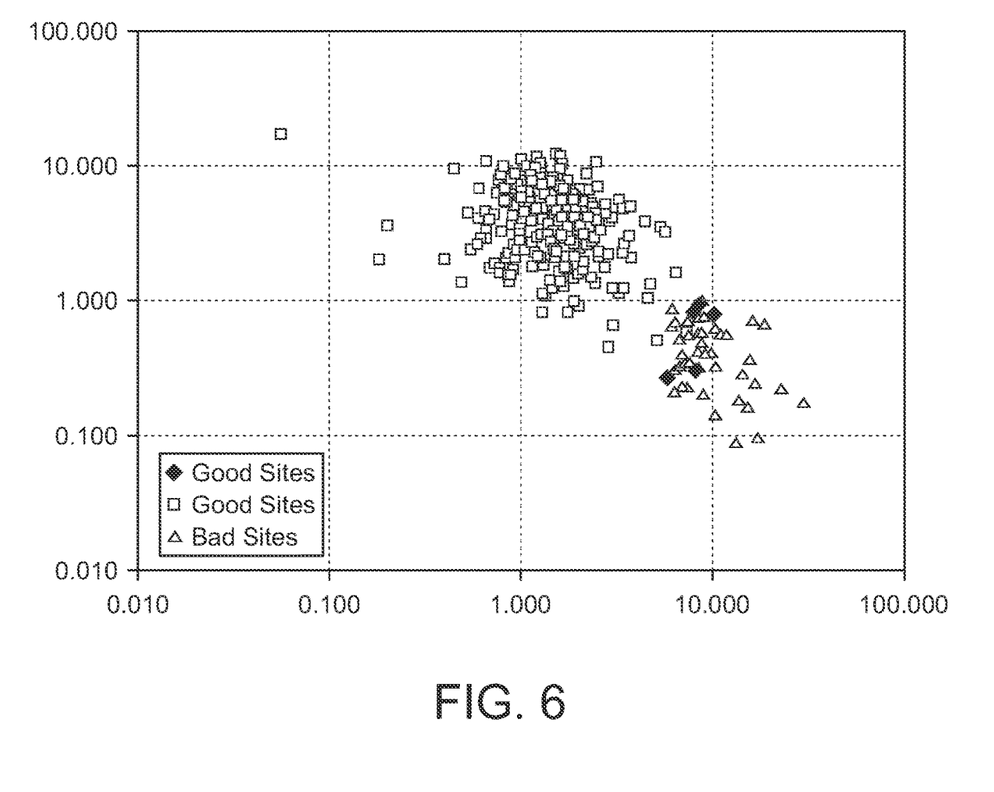
FIGS. 6 and 7 are exemplary graphs showing the identification of sites based on two evaluation metrics.
Figure 7:
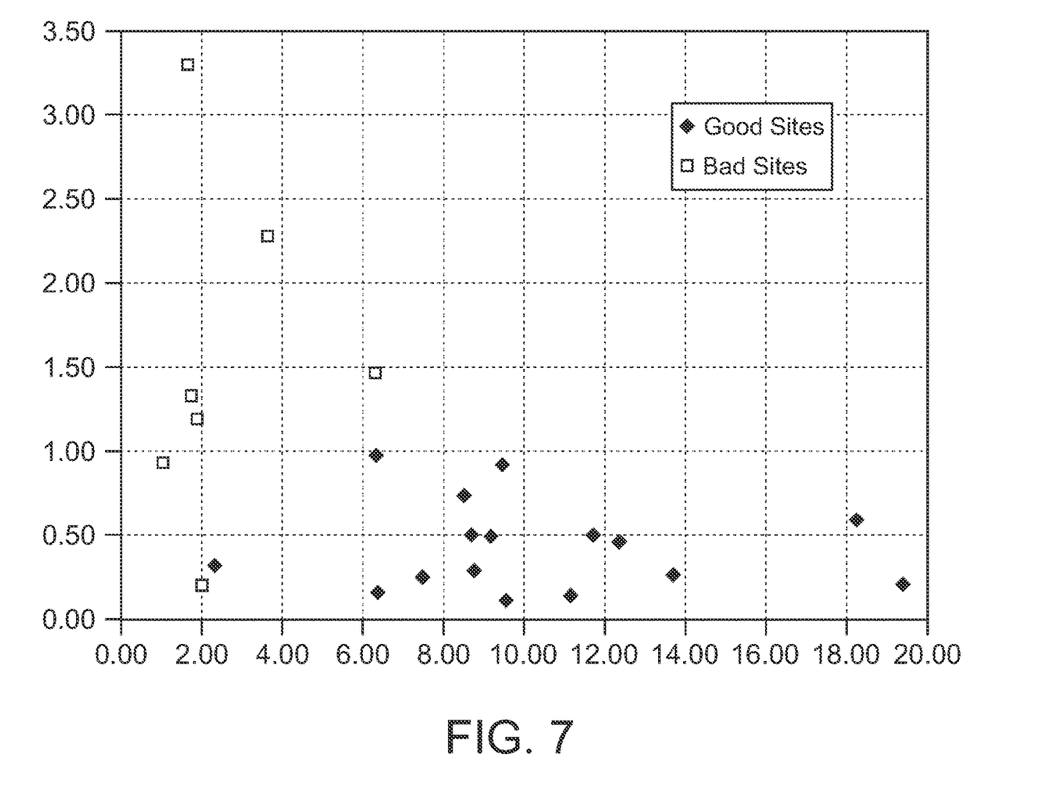
Figure 8:
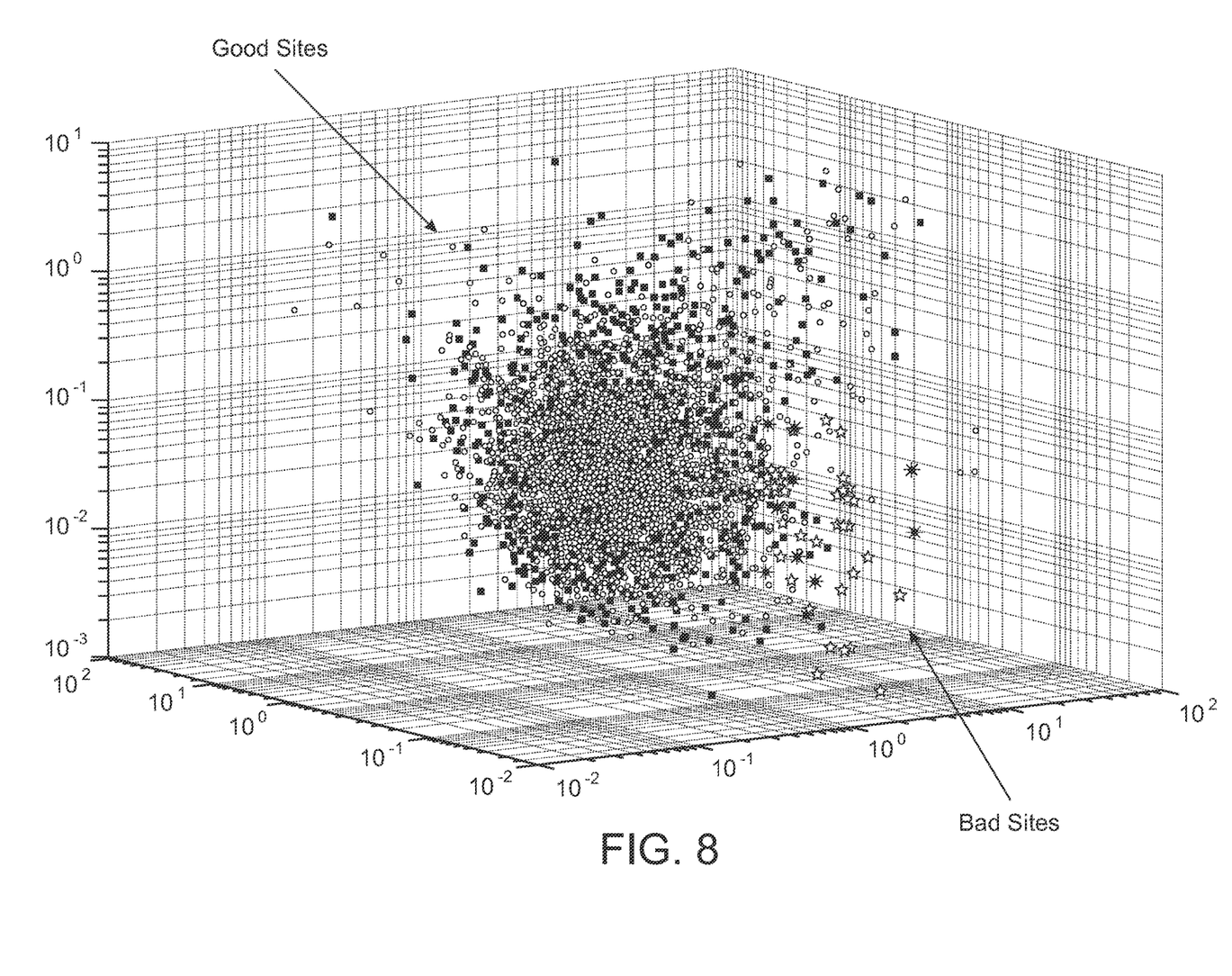
FIG. 8 is an exemplary three dimensional graph showing the identification of sites based on three evaluation metrics.

A first evaluation metric can be based on the normalized ratio of CPE lost retrain events and upstream related retrain events. The total number of CPE lost retrain events can be divided by the total number of upstream related retrain events (i.e., the sum of the occurrences of the retrain events from Table 1) and then compared to a first predetermined threshold value. In one embodiment, the first predetermined threshold value can be 1, but the first predetermined threshold value may be greater than or less than 1 in other embodiments. Exemplary logic for evaluating the first evaluation metric is provided below:

Metric 1:
　　Metric_1_Threshold=1;
　　if　　　　　　　　　　　　　　{SUM_CPE_LOST/ SUM_UPSTREAM<Metric_1_Threshold}
　　　Metric 1=true;
　　else
　　　Metric 1=false;
　　end A second evaluation metric can be based on the normalized ratio of upstream related retrain events and downstream related retrain events. The total number of upstream related retrain events (i.e., the sum of the occurrences of the retrain events from Table 1) can be divided by the total number of downstream related retrain events (i.e., the sum of the occurrences of the retrain events from Table 2) and then compared to a second predetermined threshold value. In one embodiment, the second predetermined threshold value can be 6, but the second predetermined threshold value may be greater than or less than 6 in other embodiments. Exemplary logic for evaluating the second evaluation metric is provided below:

Metric 2:
　　Metric_2_Threshold=6;
　　if　　　　　　　　　　　　　　{SUM_UPSTREAM/
　　　SUM_DOWNSTREAM>Metric_2_Threshold}
　　　Metric 2=true;
　　else
　　　Metric 2=false;
　　end A third evaluation metric can be based on the normalized ratio of upstream related loss of margin retrain events and upstream related noise retrain events. The total number of upstream related loss of margin retrain events (i.e., the sum of the occurrences for upstream loss of margin error #1 and upstream loss of margin error #2) can be divided by the total number of upstream related noise retrain events (i.e., the sum of the occurrences for increased noise upstream) and then compared to a third predetermined threshold value. In one embodiment, the third predetermined threshold value can be 0.1, but the first predetermined threshold value may be greater than or less than 0.1 in other embodiments. Exemplary logic for evaluating the third evaluation metric is provided below:

Metric 3:
　　Metric_3_Threshold=0.1;
　　if　　　{SUM_UPSTREAM_LOM/SUM_UPSTREAM_ NOISE Metric_3_Threshold}
　　　Metric 3=true;
　　else
　　　Metric 3=false;
　　end FIGS. 6 and 7 show graphs of sites determined to have fault conditions ("Bad Sites") and sites determined to not have fault conditions ("Good Sites") based on two evaluation metrics. For example, FIG. 6 can use evaluation metrics 1 and 2, as described above, to evaluate sites and FIG. 7 can use evaluation metrics 2 and 3, as described above, to evaluate sites. As can be seen in FIGS. 6 and 7, the use of two evaluation metrics can be useful in identifying sites with fault conditions. In contrast, FIG. 8 shows a graph of "Good Sites" and "Bad Sites" based on three evaluation metrics (e.g., evaluation metrics 1, 2 and 3). The use of three evaluation metrics to determine sites with fault conditions can result in fewer "false positives" (i.e., a site determined to have a fault condition, but does not actually have a fault condition).

If all of the evaluation metrics associated with a screening criteria are satisfied in step 512, the screening criteria is determined to be satisfied (step 514) and the process ends. However, if all of the evaluation metrics associated with a screening criteria are not satisfied in step 512, the screening criteria is determined to not be satisfied (step 516) and the process ends. In one embodiment, each of the evaluation metrics can be analyzed before making a determination regarding the satisfaction of screening criteria. However, in other embodiments, once a threshold value condition for an evaluation metric is not satisfied, a determination can be made that the screening criteria is not satisfied.

For example, the splitters 51-53 can be mounted on a card (e.g., a printed circuit board) that is coupled to a chassis. If the connection between the card and the chassis is defective (e.g., there is a loose connection between the card and the chassis), the processes of FIGS. 4 and 5 can be used to identify the defective connection between the card and the chassis. The defective connection between the card and the chassis can result in numerous retrain events occurring at the corresponding transceivers 61-63 (which may be located on different service units 44) coupled to the splitters 51-53 on the card. The card with the splitters 51-53 can be identified as the target site for the processes of FIGS. 4 and 5 based on the retrain events occurring at transceivers 61-63. The retrain event data can be collected for each of the transceivers 61-63 (and corresponding ports) coupled to corresponding splitters 51-53 on the card.

The screening criteria associated with a defective connection between the card and the chassis can be selected. As an example, assume that it has been observed that this type of fault generally results in a relatively large number of upstream retrain events (i.e., retrain events initiated due to degradation of upstream communication). Thus, an evaluation metric for the screening criteria may include a ratio of upstream retrain events to downstream retrain events (i.e., retrain events initiated due to degradation of downstream communication). The evaluation metrics for the screening criteria may also include other normalized parameters (or values) observed to be affected by the type of fault condition to be identified, such as a ratio of CPE lost retrains (i.e., retrain events initiated by a transceiver 61-63 at the distribution point 18 due to a loss of communication with CP transceiver 54-56) to upstream noise shift retrains (i.e., a retrain events initiated in response to shifts in upstream noise).

Once the screening criteria has been selected, the evaluation metrics associated with the screening criteria can be evaluated. For example, evaluation metrics 1-3, as discussed above, can be associated with the screening criteria for a defective connection between the card and the chassis. The collected retrain event data for all of the ports in the target site can be arranged into several different categories of retrain event types, as discussed above, associated with evaluation metrics 1-3. The categories of retrain event types can provide for a pattern of retrain events at the ports in the target site that may be associated with a defective connection between the card and chassis. The normalized values for the evaluation metrics based on the corresponding categories of retrain event types can be compared to corresponding threshold values to determine if the retrain event data conforms to the pattern and indicates the defective connection between the card and the chassis.

In this regard, a set of thresholds for the normalized parameters obtained from the evaluation metrics of the screening criteria may be associated with the type of fault condition being identified. Such set of thresholds may be empirically determined to indicate that a pattern of retrain events associated with the fault condition is present when each threshold is exceeded by its corresponding normalized parameter. For example, as indicated above, it may be determined that a faulty connection of a splitter module is likely present when the ratio of upstream retrains to downstream retrains exceeds a first threshold and when the ratio of CPE lost retrains to upstream noise shift retrains exceeds a second threshold. Note that there may be many more normalized parameters in the evaluation metrics for the screening criteria for any type of fault condition. If the controller 65 determines that each threshold associated with the normalized parameters of a given type of fault condition is satisfied, then the controller 65 may determine that the retrain events conform to a pattern indicative of the type of fault condition and identify an occurrence of the fault condition. Similar techniques may be used to identify other types of fault conditions affecting communication between the distribution point 18 and customer premises.

In one embodiment, the controller 65 may use a machine learning algorithm and/or artificial intelligence to analyze the retrain events for the ports at the target site to uncover patterns and trend information useful in determining whether a fault condition may be present at the target site. As known in the art, machine learning algorithms generally involve training a computer through the use of artificial intelligence by analyzing sample data sets to recognize data patterns that likely result in certain outputs or outcomes. Such machine learning algorithms may be used by the controller 65 or a network management device 27 to learn retrain event patterns that correspond to the presence of a fault condition at the target site. For example, the machine learning algorithm may identify a pattern of retrain events that corresponds to a particular fault condition at the target site. In still other embodiments, other evaluations can be performed on the retrain event data to determine a fault condition at the target site. Yet other techniques for identifying fault conditions based on retrain event data and determining the corresponding threshold values and/or other triggering conditions are possible in other embodiments.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A method of identifying fault conditions affecting communication across subscriber lines of a telecommunication system, comprising:
    collecting data indicative of retrain events occurring at each port of a plurality of ports coupled to the subscriber lines;
    determining whether the retrain events conform to a pattern indicative of a type of fault condition; and
    identifying a fault condition affecting the communication across the subscriber lines based on the determining,
    wherein the determining comprises:
        for each of the retrain events, identifying a type for the respective retrain event;
        calculating a plurality of values based on the data, each of the values indicative of a number of the retrain events associated with a respective type of retrain event, wherein the plurality of values includes a first value that is indicative of a number of the retrain events of a first type occurring at more than one of the plurality of ports for more than one of the subscriber lines; and
        calculating normalized parameters based on the plurality of values, including at least the first value, wherein each of the normalized parameters is calculated by mathematically combining the plurality of values; and
        evaluating whether the normalized parameters indicate that the retrain events conform to the pattern.

2. The method of claim 1, wherein the evaluating comprises comparing the normalized parameters to a set of thresholds associated with the type of fault condition.

3. The method of claim 1, wherein the type of fault condition is associated with communication equipment at the distribution point connected to each of the subscriber lines.

4. The method of claim 1, wherein the plurality of values includes a second value indicative of a number of the retrains of a second type occurring at more than one of the plurality of ports for more than one of the subscriber lines, wherein the normalized parameters include a first normalized parameter and a second normalized parameter, and wherein the calculating comprises mathematically combining the first value and the second value to generate the first normalized parameter.

5. The method of claim 4, wherein the evaluating comprises comparing the first normalized parameter to a first threshold.

6. The method of claim 5, wherein the evaluating comprises comparing the second normalized parameter to a second threshold, and wherein the determining is based on the comparing the first normalized parameter to the first threshold and the comparing the second normalized parameter to the second threshold.

7. A method of identifying fault conditions at a distribution point of a telecommunication system, the method comprising:
  selecting, by at least one processor, a plurality of ports located at the distribution point, wherein the plurality of ports are associated with a hardware component of the distribution point;
  collecting, by the at least one processor, data regarding retrain events occurring at each port of the plurality of ports;
  storing, in memory, the collected retrain event data for the plurality of ports;
  identifying, by the at least one processor, a plurality of evaluation metrics;
  grouping, by the at least one processor, the collected retrain event data for the plurality of ports into a plurality of categories associated with the plurality of evaluation metrics, wherein each category of the plurality of categories includes at least one retrain event from the collected retrain event data, and wherein at least one of the plurality of categories includes retrain events for more than one of the plurality of ports;
  generating a value for each evaluation metric of the plurality of evaluation metrics based on a number of retrain events in each category of the plurality of categories associated with the evaluation metric, the generated values including a value that is based on a number of retrain events occurring for more than one of the plurality of ports; and
  determining, by the at least one processor, whether a fault condition is present at the hardware component based on the generated values for the plurality of evaluation metrics conforming to a pattern.

8. The method of claim 7, further comprising:
  selecting, by the at least one processor, a screening criteria for the hardware component, wherein the screening criteria is associated with the fault condition and the plurality of evaluation metrics are associated with the selected screening criteria; and
  wherein the determining whether a fault condition is present at the hardware component includes:
    determining, by the at least one processor, whether the plurality of evaluation metrics are satisfied based on the generated values; and
    determining, by the at least one processor, whether the screening criteria is satisfied based on the determination of the satisfaction of the plurality of evaluation metrics, wherein the determination that the screening criteria is satisfied indicates that the fault condition is present at the hardware component.

9. The method of claim 8, wherein the generating a value for each evaluation metric of the plurality of evaluation metrics includes calculating a normalized value for each evaluation metric based on the number of retrain events in at least two categories of the plurality of categories associated with the evaluation metric.

10. The method of claim 9, wherein the determining whether the one or more evaluation metrics are satisfied includes comparing the generated normalized value for each evaluation metric to a corresponding threshold value.

11. The method of claim 9, wherein the calculating the normalized value includes determining a ratio of the number of retrain events in the identified at least two categories.

12. The method of claim 7, wherein the fault condition corresponds to an improper connection at the hardware component.

13. The method of claim 7, further comprising performing a remedial action for the hardware component in response to the determination that the fault condition is present at the hardware component.

14. The method of claim 7, wherein the hardware component is connected to each of the plurality of ports.

15. A telecommunication system having a distribution point communicatively coupled between a network and a plurality of customer premises, comprising:
  a plurality of hardware components at the distribution point, wherein each hardware component of the plurality of hardware components is associated with a plurality of ports at the distribution point, each port of the plurality ports having a transceiver coupled to a respective one of a plurality of subscriber lines;
  memory configured to store information relating to retrain events for each port of the plurality of ports; and
  at least one processor configured to:
    select a target site at the distribution point, the target site corresponding to a group of ports of the plurality of ports, wherein the group of ports is associated with a hardware component of the plurality of hardware components;
    select a screening criteria for the target site, wherein the screening criteria is associated with the fault condition;
    group the stored retrain event data for the group of ports into a plurality of categories, wherein at least one of the plurality of categories includes retrain events for more than one of the plurality of ports;
    calculate a number of retrain events in each category of the plurality of categories;
    calculate a plurality of values for the selected screening criteria based on the calculated number of retrain events in the plurality of categories, the calculated plurality of values including a value that is based on a number of retrain events occurring for more than one of the plurality of ports; and
    determine whether a fault condition is present at the target site based on the calculated plurality of values for the selected screening criteria for the target site.

16. The system of claim 15, wherein the at least one processor is further configured to:
  identify a plurality of evaluation metrics for the selected screening criteria;
  associate the calculated plurality of values to the identified plurality of evaluation metrics;
  determine whether the plurality of evaluation metrics are satisfied based on the calculated plurality of values; and
  determine whether the screening criteria is satisfied based on the determination of the satisfaction of the plurality of evaluation metrics, wherein the determination that the screening criteria is satisfied indicates that the fault condition is present at the target site.

17. The system of claim 16, wherein the at least one processor is further configured to generate a normalized value for each evaluation metric.

18. The system of claim 17, wherein the at least one processor is further configured to compare the generated normalized value for each evaluation metric to a corresponding threshold value to determine whether the plurality of evaluation metrics are satisfied.

19. The system of claim 17, wherein the at least one processor is further configured to:
 identify at least two categories of the plurality of categories associated with each evaluation metric of the plurality of evaluation metrics; and
 calculate the normalized value for the evaluation metric based on the calculated number of retrain events in the identified at least two categories.

20. The system of claim 19, wherein the at least one processor is further configured to determine a ratio of the calculated number of retrain events for the identified at least two categories to calculate the normalized value.

21. The system of claim 15, wherein each category of the plurality of categories is based on at least one of a type of retrain event or a direction associated with a retrain event.

22. The system of claim 15, wherein the fault condition corresponds to an improper connection at the hardware component.

23. The system of claim 15, wherein each transceiver of the plurality of ports is configured to communicate in accordance with a digital subscriber line format, and the at least one processor is configured to perform vectoring to cancel crosstalk between the plurality of subscriber lines.

24. The system of claim 15, wherein the hardware component is connected to each of the plurality of ports.

25. A method of identifying a fault condition at a distribution point of a telecommunication system, the method comprising:
 selecting, by at least one processor, a plurality of ports at the distribution point;
 collecting, by the at least one processor, data regarding retrain events occurring at each port of the plurality of ports;
 storing, in memory, the collected retrain event data;
 selecting, by the at least one processor, a screening criteria associated with the fault condition;
 identifying, by the at least one processor, a plurality of evaluation metrics for the selected screening criteria;
 evaluating, by the at least one processor, the plurality of evaluation metrics, wherein the evaluation of the plurality of evaluation metrics is based on the stored retrain event data, and wherein at least one of the evaluation metrics is based on a number of retrain events occurring at more than one of the plurality of ports;
 determining, by the at least one processor, whether the plurality of evaluation metrics are satisfied; and
 determining, by the at least one processor, whether the screening criteria is satisfied based on the determination of the satisfaction of the plurality of evaluation metrics, wherein the determination that the screening criteria is satisfied indicates that the fault condition is present at the distribution point.

26. The method of claim 25, wherein the evaluating the plurality of evaluation metrics includes generating a normalized value for each evaluation metric and the determining whether the plurality of evaluation metrics are satisfied includes comparing the generated normalized value for each evaluation metric to a corresponding threshold value.

27. The method of claim 25, wherein the fault condition is associated with communication equipment at the distribution point connected to each of the plurality of ports.

* * * * *